No. 658,288. Patented Sept. 18, 1900.
T. SHAW & J. C. LEE.
CRUSHER AND PULVERIZER.
(Application filed Feb. 9, 1900.)
(No Model.) 2 Sheets—Sheet 1.
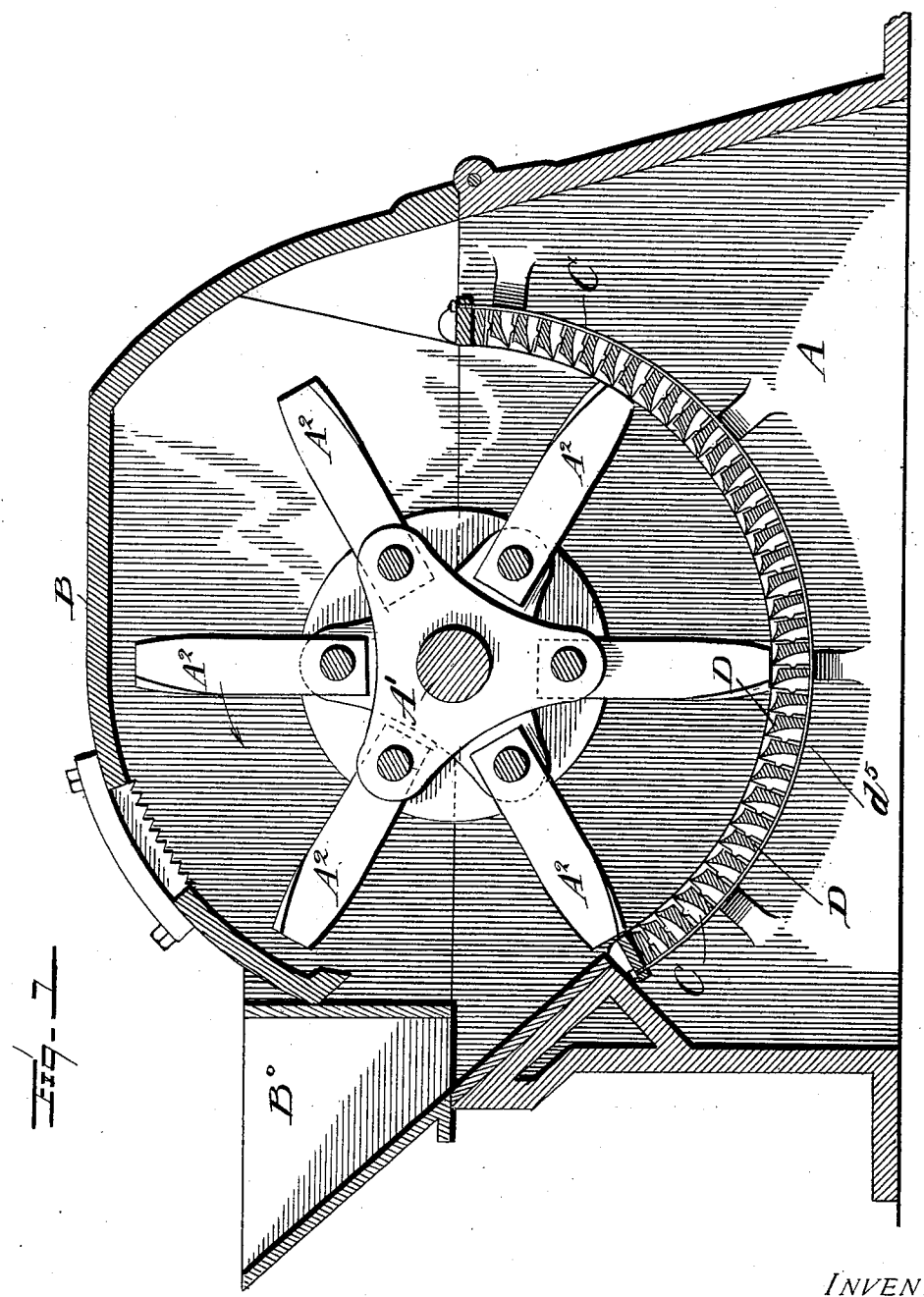

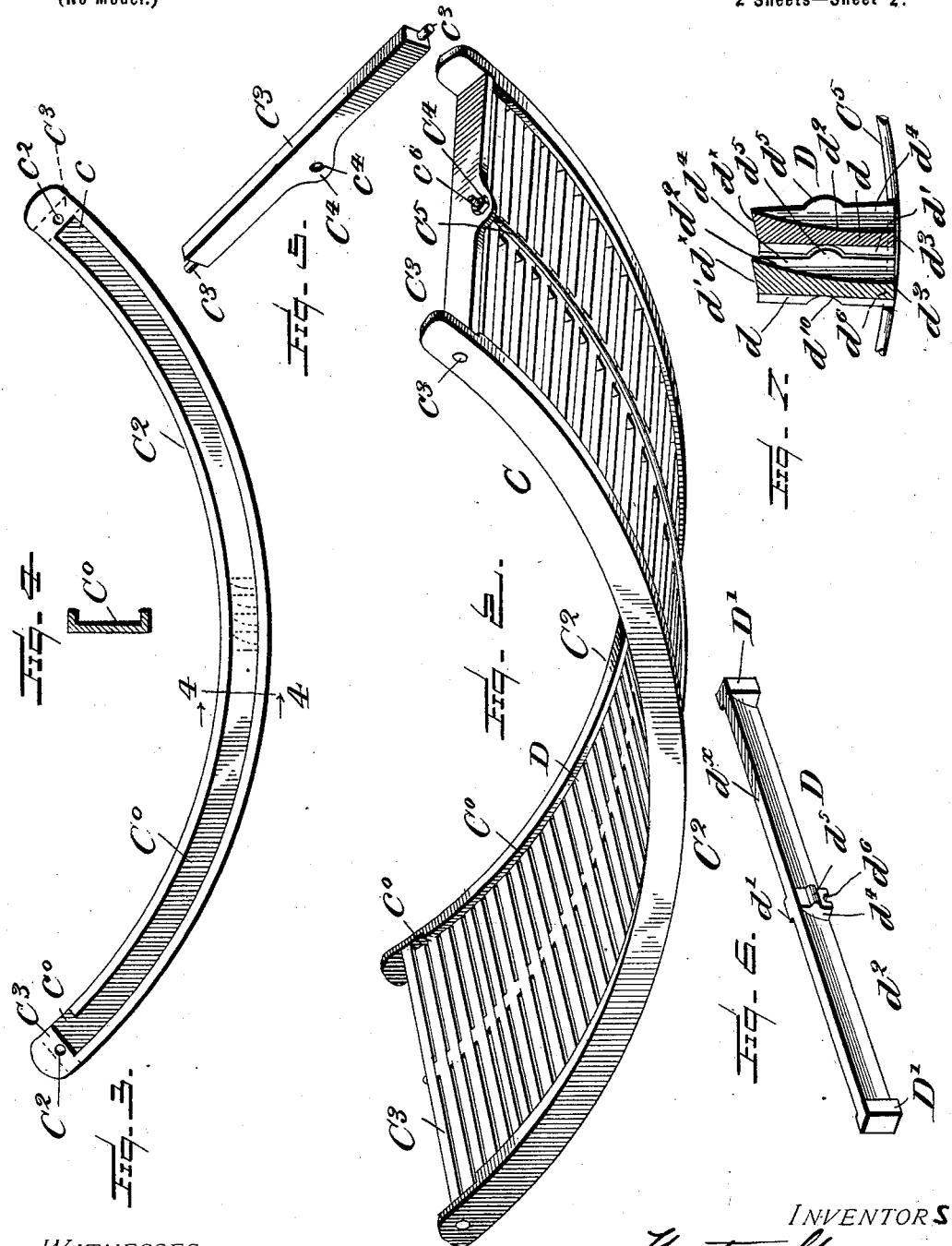

UNITED STATES PATENT OFFICE.

THAXTER SHAW AND JOHN C. LEE, OF MEDFORD, WISCONSIN.

CRUSHER AND PULVERIZER.

SPECIFICATION forming part of Letters Patent No. 658,288, dated September 18, 1900.

Application filed February 9, 1900. Serial No. 4,672. (No model.)

*To all whom it may concern:*

Be it known that we, THAXTER SHAW and JOHN C. LEE, citizens of the United States, residing at Medford, in the county of Taylor and State of Wisconsin, have invented certain new and useful Improvements in Crushers and Pulverizers; and we do hereby declare the following to be a full, clear, and exact description of the invention, such as will enable others skilled in the art to which it appertains to make and use the same.

Our invention relates to improvements in machines for crushing or pulverizing all kinds of animal, vegetable, and mineral substances; and it has for its object to provide particularly an improved frame or cage against which the beaters act in crushing or pulverizing operation of the machine.

Our invention consists in the novel features hereinafter described and claimed, and will be understood by reference to the accompanying drawings, wherein the same parts are indicated by the same letters throughout the several views.

Figure 1 represents a vertical sectional view of a crushing or pulverizing machine provided with our invention. Fig. 2 represents a detail perspective view of the "cage" which constitutes our invention. Fig. 3 is a detail elevation as seen from the inner side of one of the segmental side members of the cage. Fig. 4 is a sectional view, enlarged, taken on the line 4 4 in Fig. 3 and looking in the direction of the arrow. Fig. 5 is a perspective view of one of the cross-heads shown in Fig. 2, which connect the ends of the curved side beams. Fig. 6 is a perspective view, enlarged, of one of the knives which are held between the curved beams shown in Fig. 2; and Fig. 7 is an enlarged detail cross-section through two adjacent knives.

Referring to Fig. 1, A represents the casing of the machine, which incloses the rotary beaters $A^2$, mounted upon the shaft $A'$, and also incloses the cage or frame C, with which the said rotary beaters coöperate. This cage or frame C, which is constructed in sectional form, as hereinafter described, is mounted in said casing A, with its concave side arranged concentric to the axis of rotation of the beaters $A^2$. The casing is preferably provided with a hinged cover B and a feed-hopper $B^0$, as shown in Fig. 1. Our invention consists, however, in the construction of the cage or frame C. This cage or frame, which is shown complete in Fig. 2, consists of two side beams or bars $C^2$ in the form of segments of a circle of the appropriate radius. These side beams or bars $C^2$ are constructed oppositely, each with a segmental slot $C^0$ running almost the entire length of the bar, the said slot being closed at one end $c'$ and opening upon the concave edge of the bar at the extreme opposite end thereof, as seen at $c^0$ in Fig. 4. Near the extreme ends of the said segmental bars $C^2$ are formed openings $c^2$ for the reception of studs or projections $c^3$ on the ends of the cross-bars $C^3$. There are two of these cross-bars $C^3$, as shown in Fig. 2, and they are permanently secured at their ends to the curved bars $C^2$ by having the ends of the projections $c^8$ riveted in the openings $c^2$, thus forming a rigid frame. The cross-bars $C^3$ are each provided with a central enlargement or lug $C^4$, provided with a perforation $c^4$ for the passage of a truss-rod $C^5$, (seen in Fig. 2,) the said truss-rod being removable and adjustable by means of a nut engaging a screw-threaded end thereof, as seen at $c^6$.

The knives or cutting-bars D (most clearly seen in Figs. 6 and 7) are separately formed and each similar to all the others. Thus each knife or cutting-bar D is provided with a plane rear face $d$, upon which is centrally formed a transverse rib or enlargement $d'$, said rib or enlargement having a transverse groove $d^0$ therein. The front face of each knife D is formed with a curved or slightly-concaved contour $d^2$, which is deepest at or near the base edge $d^3$ of the knife or bar. Upon the upper or cutting edge $d^\times$ of the knife or bar is an upward inclination or bevel from the rear side $d$ to the forward side $d^2$, as seen most clearly in Fig. 7, the effect being when the knives or bars are fitted together a serrated appearance in cross-section to the assembled group of knives. Upon the forward or concave face of the bar D is formed centrally a transverse rib $d^4$, having a central transverse rib or boss $d^5$ thereon, so arranged and of such size as to fit the groove $d^0$ in the rib $d'$ upon the rear side of the adjacent knife when the knives are assembled as seen in Fig. 7. Each bar or knife D has a squared boss or enlargement D' upon each end arranged to fit within the grooves $C^0$ upon the inner sides of the curved bars $C^2$, the said knives being placed in position in the said grooves one at a time by having their ends D' passed in the grooves $C^0$ through the passages $c^0$ at one end of the said slots. When assembled, the vertical sides of the bosses D abut against one another, their thickness corresponding to the distance between the opposite faces of the ribs $d'$ and $d^4$ upon the front and rear faces of the knives or bars D. The spaces between the front and rear edges of the assembled knives allow the disintegrated material to pass through and fall beneath the cage. Each knife-bar is provided with a central groove $d^6$ in its base edge, said groove running transversely of the bar extending through the central enlargements at the center of the bar, as seen in Figs. 6 and 7, and in these grooves $d^6$, which when the knives or bars are assembled constitute a continuous groove, the truss-rod $C^5$ engages, and thus forms a central support for the knives, as seen in Figs. 1 and 2. As hereinbefore described, the truss-rod $C^5$ may be adjusted to bind the bars in position or to release the same by means of a nut $c^6$ upon one or each end of the said truss-rod. When the truss-rod has been drawn taut beneath the knives, the latter will be held securely and rigidly in position in the slots $C^0$ of the curved bars $C^2$, and should any one or more of these knives become loose they may be readily tightened by screwing up the nut $c^6$ on one or both ends of the truss-rod $C^5$.

By reason of the bevel-cutting edge $d^\times$ of the knives or bars they may be readily sharpened upon an emery-wheel or other suitable sharpening device when they become worn, and, further, should one of such knives break or become injured to such an extent as to become useless it may be easily replaced.

The form of cage herein described is adaptable to all machines for crushing and pulverizing now in use, particularly of the type shown in patent to Williams, No. 589,263, dated August 31, 1897, and the forms of knives which constitute a portion of our invention are particularly well adapted for grinding or pulverizing barks and other fibrous vegetable materials.

The particular advantages of our invention reside in its simplicity and consequent cheapness coupled with the advantages arising from the peculiar construction thereof. These will be apparent to any practical mind and need not be further referred to herein.

Having thus described our invention, what we claim, and desire to secure by Letters Patent of the United States, is—

1. In a crushing and pulverizing machine, a stationary cage or frame arranged to be operated against by the beaters, said frame comprising a pair of curved members provided upon their inner opposite faces with longitudinal grooves, and cross-heads rigidly connecting their corresponding ends, a plurality of sectional knife-bars engaging at their ends in said slots, and a truss-rod engaging at its opposite ends in said cross-heads and passing beneath said knife-bars upon the convex side of said frame, substantially as described.

2. In a crushing and pulverizing machine, a stationary cage or frame arranged to be operated against by the beaters, said frame comprising a pair of curved members provided upon their inner opposite faces with longitudinal grooves, and cross-heads rigidly connecting their corresponding ends; a plurality of sectional knife-bars engaging at their ends in said slots; said knife-bars having central transverse grooves in their base edges in alinement; and a truss-rod engaging at its opposite ends in said cross-heads and passing beneath said knife-bars upon the convex side of said frame engaging in said grooves, substantially as described.

In testimony whereof we affix our signatures in presence of two witnesses.

THAXTER SHAW.
JOHN C. LEE.

Witnesses:
JOHN B. HAGARTY,
C. A. ANDRESEN.